US012487332B2

(12) United States Patent
Karayacoubian et al.

(10) Patent No.: US 12,487,332 B2
(45) Date of Patent: Dec. 2, 2025

(54) FANLESS DESIGN OF A ROTATING LIDAR SYSTEM WITH INTEGRATED CLEANING AND COOLING

(71) Applicant: LG INNOTEK CO., LTD., Seoul (KR)

(72) Inventors: Paul Karayacoubian, Mountain View, CA (US); Aaron Rifkin, San Francisco, CA (US); Arnab Bagchi, Munich (DE); Miguel Angel Avila Diaz, Munich (DE); Bilge Kocer, Mountain View, CA (US); Chris J. Trowbridge, Dexter, MI (US); Morgan M. Wagner, Pittsburgh, PA (US)

(73) Assignee: LG INNOTEK CO., LTD., Seoul (KR)

( * ) Notice: Subject to any disclaimer, the term of this patent is extended or adjusted under 35 U.S.C. 154(b) by 1211 days.

(21) Appl. No.: 17/344,055

(22) Filed: Jun. 10, 2021

(65) Prior Publication Data

US 2022/0221560 A1      Jul. 14, 2022

Related U.S. Application Data

(60) Provisional application No. 63/137,687, filed on Jan. 14, 2021.

(51) Int. Cl.
  *G01S 7/48*       (2006.01)
  *G01S 7/481*      (2006.01)
  *G01S 17/931*     (2020.01)

(52) U.S. Cl.
  CPC .......... *G01S 7/4813* (2013.01); *G01S 7/4817* (2013.01); *G01S 17/931* (2020.01)

(58) Field of Classification Search
  None
  See application file for complete search history.

(56) References Cited

U.S. PATENT DOCUMENTS

| 8,767,190 | B2 * | 7/2014 | Hall ........................ G01S 17/89 356/9 |
| 10,054,841 | B2 * | 8/2018 | Nomura .................. G01F 1/661 |
| 11,237,028 | B1 * | 2/2022 | Surineedi ................ G01S 7/027 |
| 2017/0261273 | A1 | 9/2017 | Maranville et al. |
| 2018/0109061 | A1 * | 4/2018 | Pardhan ................ G01S 7/4813 |
| 2019/0064355 | A1 | 2/2019 | Pacala et al. |

(Continued)

FOREIGN PATENT DOCUMENTS

KR      20180093865 A      8/2018

OTHER PUBLICATIONS

International Search Report of PCT/US2022/011676 mailed Apr. 28, 2022, 3 pages.

(Continued)

*Primary Examiner* — Xanthia C Relford
*Assistant Examiner* — Xanthia C Cunningham
(74) *Attorney, Agent, or Firm* — Birch, Stewart, Kolasch & Birch, LLP

(57) ABSTRACT

Systems and methods are disclosed for a fanless design of a rotating LIDAR system with integrated cleaning and cooling. An example system may include an enclosure including one or more electronics. The example system may also include a cooling element provided externally to the enclosure, the cooling element comprising one or more horizontal fins.

20 Claims, 8 Drawing Sheets

(56) References Cited

U.S. PATENT DOCUMENTS

| | | | | |
|---|---|---|---|---|
| 2019/0273421 A1* | 9/2019 | Velderman | ............ | H02K 11/215 |
| 2019/0337489 A1* | 11/2019 | Baldovino | ............. | G01N 21/15 |
| 2020/0191614 A1* | 6/2020 | Ellgas | .................... | G01D 11/24 |
| 2020/0309913 A1* | 10/2020 | Oliveira | .................... | F28F 5/00 |
| 2022/0283270 A1* | 9/2022 | Lee | .................... | H05K 7/20863 |

OTHER PUBLICATIONS

Written Opinion of PCT/US2022/011676 mailed Apr. 28, 2022, 3 pages.

\* cited by examiner

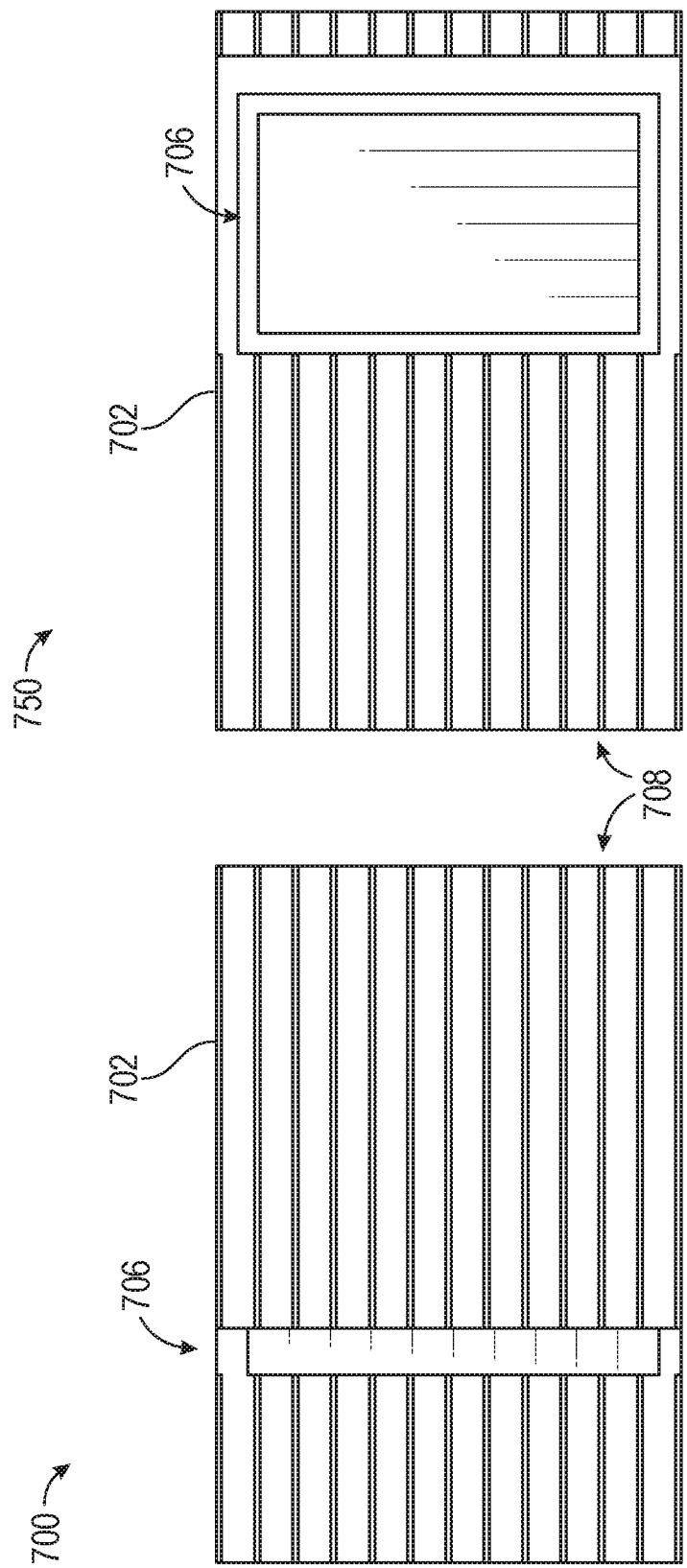

FANLESS DESIGN OF A ROTATING LIDAR SYSTEM WITH INTEGRATED CLEANING AND COOLING

CROSS-REFERENCE TO RELATED PATENT APPLICATION

The present application is related to and claims priority from Application No. 63/137,687 filed on Jan. 14, 2021 titled "FANLESS DESIGN OF A ROTATING LIDAR SYSTEM WITH INTEGRATED CLEANING AND COOLING."

BACKGROUND

LIDAR systems may rotate at a particular frequency and may also dissipate a certain amount of power. Any electronics included within the LIDAR system may be required to be maintained within tight acceptable temperature limits for the unit to function as intended.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 7A-7B depict example side views of a cooling element, in accordance with one or more example embodiments of the disclosure.

DETAILED DESCRIPTION

Figure 1:
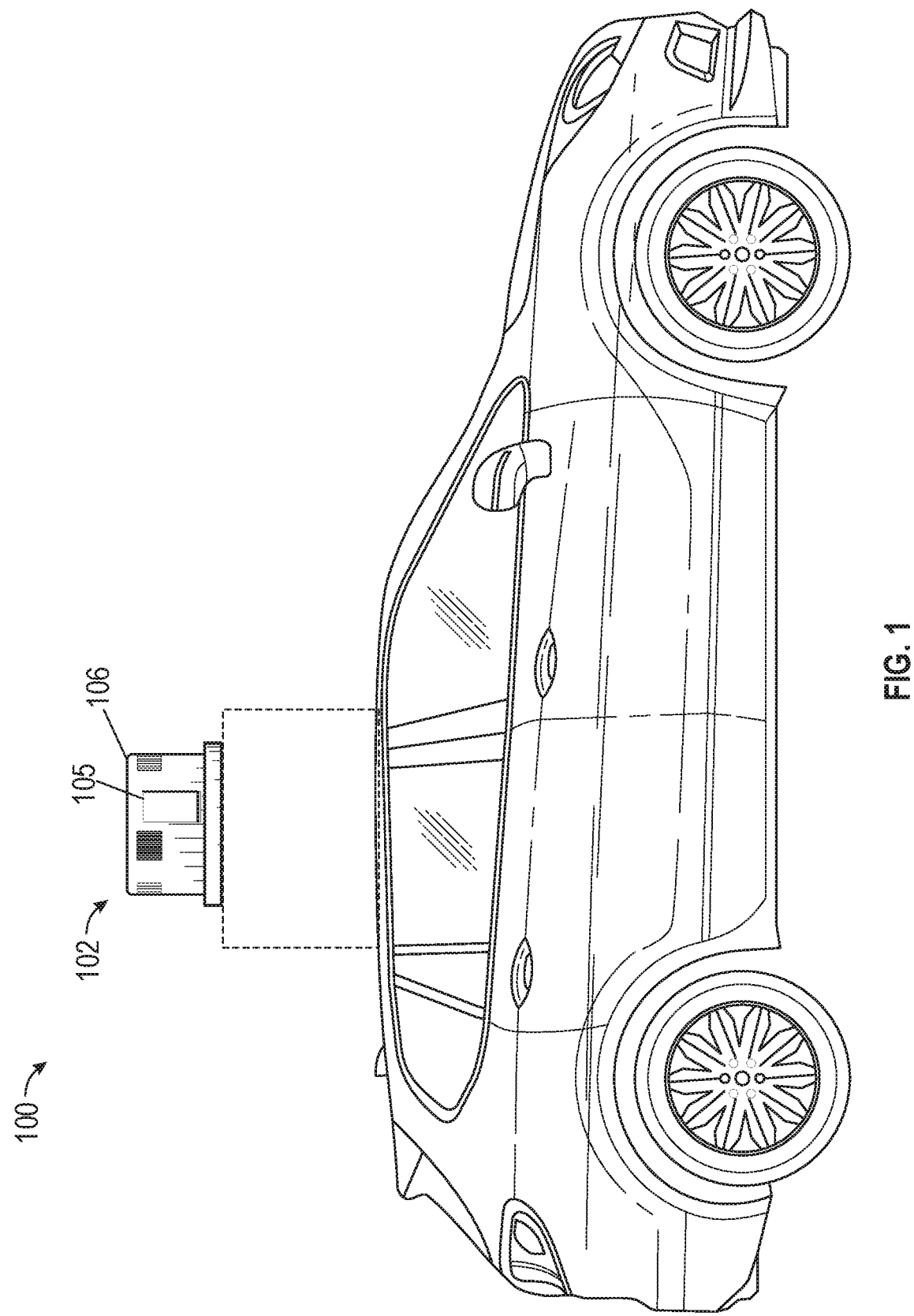
FIG. 1 depicts an example LIDAR system, in accordance with one or more example embodiments of the disclosure.

This disclosure relates to, among other things, a fanless design of a rotating LIDAR system with integrated cleaning and cooling. That is, the LIDAR system may include a cooling element that may be capable of cooling the LIDAR system, and/or some or all of the electronics included within the LIDAR system, without requiring the use of a fan to generate air flow across and/or through the cooling element. In some cases, the cooling element may be a heat sink (for example, as depicted in FIGS. 2-7) that may be used to dissipate heat away from the electronics. Instead of relying on a fan to generate airflow across and/or through the cooling element as it receives heat transfer from the electronics, the cooling element described herein may instead take advantage of the free-flowing air that may be provided by an environment external to the LIDAR system. For example, the LIDAR system may be incorporated onto a vehicle, and the vehicle may be traversing the environment. As the vehicle traverses the environment, air may flow across the vehicle and the LIDAR system, and correspondingly may also flow across and/or through the cooling element as well. The specific structural configuration of the cooling element as described below may allow the air flow from the environment to pass through the cooling element.

In some embodiments, the cooling element may be a single solid structure that may be provided around the enclosure including the electronics. For example, the cooling element may be bolted to, or screwed into, the enclosure, or may be removably affixed to the enclosure in any number of other ways. In some cases, the cooling element may also be permanently affixed to the enclosure. In even further cases, the cooling element may be comprised of multiple separate portions rather than being a single solid element. For example, a first segment (first horizontal fin) of the cooling element may be removably affixed to the enclosure and a second segment (second horizontal fin) of the cooling structure may be removably affixed to the enclosure, and the first horizontal fin may be able to be removed from the enclosure, while the second horizontal fin may remain affixed. This is merely one non-limiting example, any and other number of horizontal fins may also be provided that may be separately removable. Additionally, while reference may be made herein to an enclosure that houses the electronics, in some cases, the electronics may simply be in direct contact with the cooling element itself as well.

In some embodiments, the cooling element may include one or more fins that may be arranged around the enclosure in any suitable configuration. In some cases, the one or more fins may be horizontal fins and may extend outward from the enclosure. Including the one or more fins in the horizontal arrangement may allow natural airflow from the environment to pass in between the one or more fins and through the cooling element as described above. For example, if the cooling element is provided in a LIDAR system on a vehicle, the airflow generated as the vehicle traverses the environment may pass in between the one or more fins of the cooling element. This may allow for the cooling element to provide cooling capabilities without the need for dedicated fans to generate airflow, which may be necessary if the one or more fins were provided in a vertical arrangement. For example, if the fins were provided in a vertical arrangement, airflow may be prevented from flowing through the cooling element, as the vertical fins may serve as a barrier to airflow from the environment when the cooling element is undergoing rotation along with the LIDAR system. Additional airflow may also be generated based on the rotation of the LIDAR system and the cooling element as well.

In some embodiments, the one or more fins may be any shape and/or size, and may be separated by any amount of space. As one non-limiting example, the fins may be 1 mm thick and may be separated by a spacing of 4 mm. However, any other thickness, spacing, or other properties of the fins may also be applicable. Additionally, the cooling element may include any number of fins. The one or more fins may also be composed of any material, such as, for example, aluminum. The one or more fins may also be nickel-plated or anodized, or may be created through any number of other types of treatment processes. The number of fins, size and/or shape of each of the fins, and any other properties of the fins and/or the cooling element as a whole may also vary depending on their proximity to locations on the enclosure at which it may be desired to provide additional cooling. For example, a part of an enclosure adjacent to a particular LIDAR electronic may be desired to be cooled to a greater extent than a part of the enclosure not adjacent to any LIDAR electronics (more heat may need to be dissipated from the portions of the enclosure including electronics than the portions of the enclosure not including electronics, for example). In this case, the portion of the cooling element in contact with the part of the enclosure adjacent to the LIDAR electronics may be configured in such a way as to provide additional cooling at that location. That is, the fins of the cooling element at this location may be different in size than fins at locations not associated with electronics.

In some embodiments, the horizontal fins may extend from the enclosure such that the cooling element may generally form a cylindrical or partially-cylindrical shape (for example, as illustrated in FIGS. 2-7). However, the shape of the cooling enclosure may not necessarily be limited to a cylindrical or partially-cylindrical shape. While the shape of the cooling element may be generally cylindrical, the cooling element may also include one or more portions that may not include horizontal fins, but may instead include one or more windows in place of the horizontal fins at those particular portions (this may also be illustrated in FIGS. 2-7 as well). The one or more windows may provide signal ingress and/or egress for the electronics housed within the enclosure. For example, as mentioned above, the enclosure may include one or more emitting device(s) and one or more detector device(s). The windows may be positioned such that egress of light signals from the one or more emitting device(s) and ingress of return light signals to the one or more detector device(s) may be possible through the cooling element. As such, the one or more windows may comprise a transparent or semi-transparent material, such as glass. In some cases, instead of using a transparent material to allow for ingress/egress, an opening may simply be provided as well. Additionally, while the airflow from the environment may be used to cool the cooling element, the structural configuration of the cooling element including the horizontal fins may also allow the airflow from the environment to pass over the one or more windows. In this manner, the structure of the cooling element may also serve a dual purpose of leveraging the natural airflow from the environment to clear the one or more windows of any contaminants (for example, debris, rain, etc.). The spacing between the horizontal fins may be large enough that cleaning air may be delivered to the windows without any additional air provided from fans or blowers.

In some embodiments, the cooling element may be provided around the enclosure and may be directly exposed to the environment (for example, may not be covered). However, in some embodiments, an outer rim or solar shield may be provided around the cooling element as well. The outer rim or solar shield may be provided to assist in keeping the LIDAR system within thermal requirements at a steady state. That is, the outer rim or solar shield may prevent or mitigate the exposure of the cooling element to solar radiation, which may prevent or mitigate temperature increases of the cooling element based on the solar radiation. Allowing the cooling element to be exposed to the environment without the use of the outer rim or solar shield, however, may allow for more unrestricted airflow through the cooling element, which may enhance the cooling capabilities of the cooling element.

Turning to the figures, FIG. 1 depicts an example LIDAR system 100. In some embodiments, the LIDAR system may include a sensor head 102. The sensor head 102 may be an element of the LIDAR system 100 that may house certain electronic components of the LIDAR system 100, for example in an enclosure housed within a housing 106 (however, in some embodiments, as described below, the sensor head 102 in the LIDAR system 100 may not include the housing 106, but may simply include an exposed enclosure). The sensor head 102 may also include the cooling element described herein (not shown in the figure). In embodiments in which a housing 106 is included, the housing 106 may include one or more windows 105 (which may be referred to interchangeably as "openings" herein) through which the enclosure 104 may be exposed to an external environment 108 as well. The one or more windows 105 may allow for light ingress and/or egress from the enclosure 104 and housing 106 with respect to the environment 108 external to the LIDAR system 100. The one or more windows 105 may also allow for airflow from the environment 108 to enter and/or exit the inside of the housing 106. In this regard, airflow from the environment may flow through the housing 106, through the cooling element (for example, in between the horizontal fins on the cooling element as described herein), and exit the housing. This airflow through the housing 106 and the cooling element may serve to cool the cooling element, which may serve as a heat dissipater for the electronics within the enclosure 104. In some cases, the one or more windows 105 may be distinct from the one or more windows associated with the cooling element. That is, if the sensor head 102 may include a housing 106 around the cooling element, then the cooling element itself may include one or more windows, and the housing 106 may also include one or more windows. In this regard, light ingress and egress may be possible through both the cooling element and the housing 106 around the cooling element. In some embodiments, the sensor head 102 (and more specifically, the enclosure) may include one or more LIDAR electronics. For example, the sensor head 102 may include at least one or more emitting devices, one or more detector devices, and/or one or more computing systems (for example computing system 800), as well as any other LIDAR electronics. These electronics (for example, the one or more emitting devices, one or more detector devices, and/or one or more computing systems) may not necessarily be shown in FIG. 1, but may be depicted in FIG. 4, for example. The sensor head 102 may also optionally include one or more emitter-side optical elements and/or one or more receiver-side optical elements. The LIDAR system 100 may be integrated into a vehicle (not shown in the figure), which may operate in an environment external to the LIDAR system 100 (and vehicle) that may include one or more objects. Hereinafter, reference may be made to elements such as "emitting device," "detector device," "circuit," "controller," and/or "object," however such references may similarly apply to multiple of such elements as well.

In some embodiments, an emitting device may be a laser diode for emitting a light pulse. A detector device may be a photodetector, such as an Avalanche Photodiode (APD), or more specifically an APD that may operate in Geiger Mode, however, any other type of photodetector may be used as well. It should be noted that the terms "photodetector" and "detector device" may be used interchangeably herein. APDs are photodiodes that operate with a relatively large gain compared to normal photodiodes, and Geiger Mode APDs are operated slightly above the breakdown threshold voltage, where even a single electron-hole pair can trigger an output signal that is identifiable by data processing elements. The computing system (which may be the same as computing system 800, and may also be referred to herein as "signal processing elements," "signal processing systems," or the like) that may be used to perform any of the operations associated with the housing assembly or otherwise. Additionally, the sensor head 102 may rotate or spin at a given frequency, which may allow the LIDAR system 100 to emit light in different directions up to a full 360 degree field of view around the LIDAR system 100.

Figure 2:
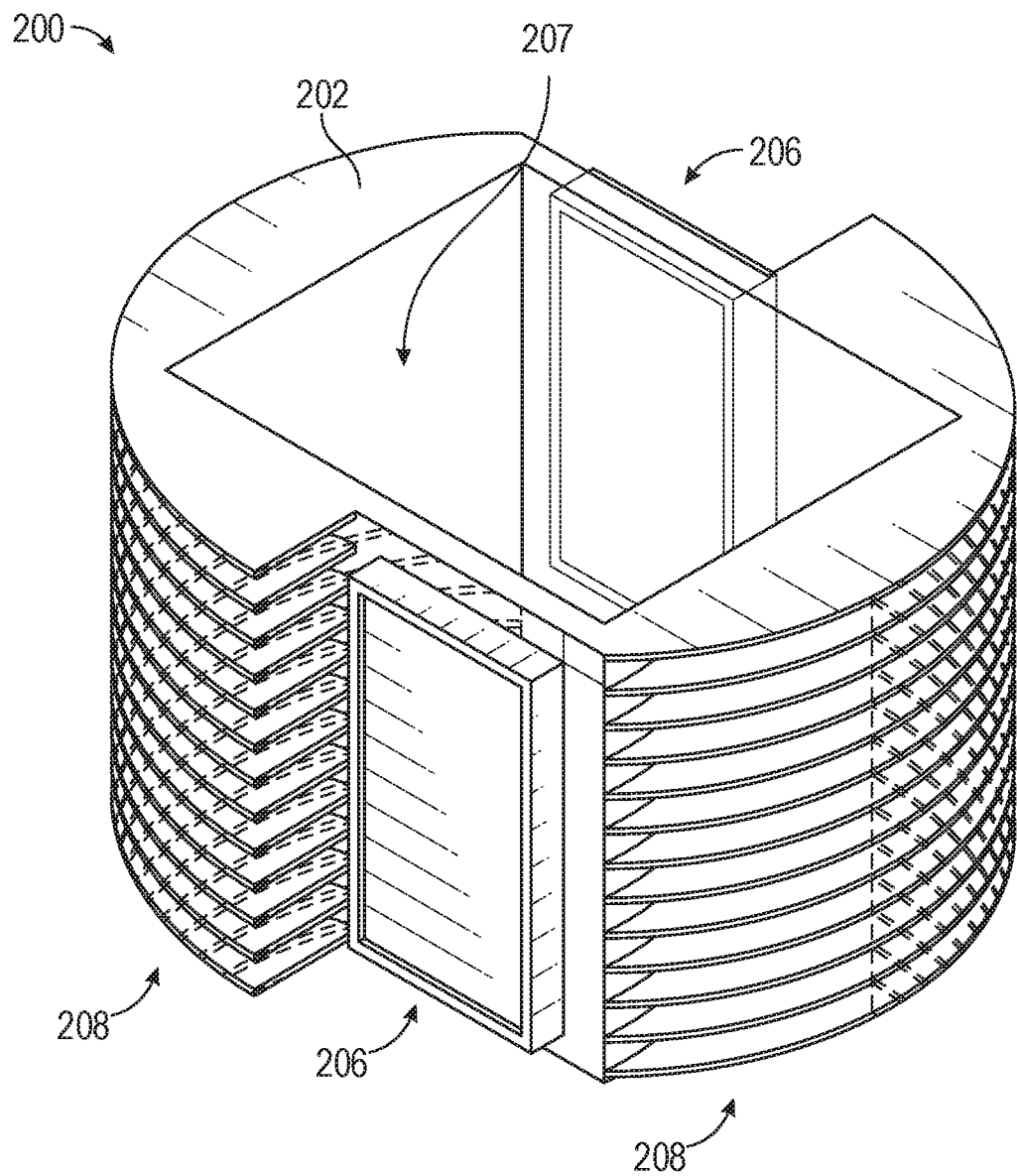
FIG. 2 depicts an example perspective view of a cooling element, in accordance with one or more example embodiments of the disclosure.

FIG. 2 depicts an example perspective view 200 of a cooling element 202 used in a LIDAR sensor head (for example, the sensor head 102 depicted in FIG. 1 or any other sensor head described herein) of a LIDAR system. In some embodiments, the cooling element 202 may surround an enclosure (which may not be illustrated in this figure, but may, for example, be the same as enclosure 104 described with respect to FIG. 1, enclosure 305 described with respect to FIG. 3, enclosure 405 described with respect to FIG. 4, or any other enclosure described herein) that may include one or more electronics (which may be the same as electronics 312 described with respect to FIG. 3, as well as the one or more emitter devices, one or more detector devices, and/or computing systems describes with respect to FIG. 1, FIG. 4, or otherwise, as well as any other electronics described herein or otherwise). Both the enclosure and the one or more electronics may not be depicted in FIG. 1, but may normally be included in the area 207 inside the cooling element 202, and may be illustrated in FIGS. 3-4. Additionally, as mentioned above, in some cases, an "enclosure" for the LIDAR electronics may not be used, and the electronics may simply be in contact with the cooling element 202 itself.

In some embodiments, the cooling element 202 may be capable of cooling the LIDAR system, and/or some or all of the electronics included within the LIDAR system, without requiring the use of a fan to generate air flow across and/or through the cooling element. In some cases, the cooling element 202 may be a heat sink that may be used to dissipate heat away from the electronics. Instead of relying on a fan to generate airflow across and/or through the cooling element 202 as it receives heat transfer from the electronics included in the area 207, the cooling element 202 described herein may instead take advantage of the free-flowing air that may be provided by an environment external to the LIDAR system. For example, the LIDAR system may be incorporated onto a vehicle, and the vehicle may be traversing the environment. As the vehicle traverses the environment, air may flow across the vehicle and the LIDAR system, and correspondingly may also flow across and/or through the cooling element 202 as well. The specific structural configuration of the cooling element 202 as described below may allow the air flow from the environment to pass through the cooling element 202.

In some embodiments, the cooling element 202 may be a single solid structure that may be provided around the enclosure including the electronics. For example, the cooling element 202 may be bolted to, or screwed into, the enclosure, or may be removably affixed to the enclosure in any number of other ways. In some cases, the cooling element 202 may also be permanently affixed to the enclosure. Although the cooling element 202 may be depicted as a single solid structure in this figure, in even further cases, the cooling element may be comprised of multiple separate portions rather than being a single solid element. For example, a first horizontal fin of the cooling element 202 may be removably affixed to the enclosure and a second horizontal fin of the cooling structure 202 may be removably affixed to the enclosure, and the first horizontal fin may be able to be removed from the enclosure, while the second horizontal fin may remain affixed. This is merely one non-limiting example, any and other number of horizontal fins may also be provided that may be separately removable.

In some embodiments, the cooling element 202 may include one or more fins 208 that may be arranged around the enclosure in any suitable configuration. In some cases, the one or more fins 208 may be horizontal fins and may extend outward from the enclosure. Including the one or more fins 208 in the horizontal arrangement may allow natural airflow from the environment to pass in between the one or more fins 208 and through the cooling element 202 as described above. For example, if the cooling element 202 is provided in a LIDAR system on a vehicle, the airflow generated as the vehicle traverses the environment may pass in between the one or more fins 208 of the cooling element 202. This may allow for the cooling element 202 to provide cooling capabilities without the need for dedicated fans to generate airflow, which may be necessary if the one or more fins 208 were provided in a vertical arrangement. For example, if the fins 208 were provided in a vertical arrangement, airflow may be prevented from flowing through the cooling element 202, as the vertical fins may serve as a barrier to airflow from the environment when the cooling element is undergoing rotation along with the LIDAR system. Additional airflow may also be generated based on the rotation of the LIDAR system and the cooling element 202 as well.

In some embodiments, the one or more fins 208 may be any shape and/or size, and may be separated by any amount of space. As one non-limiting example, the fins 208 may be 1 mm thick and may be separated by a spacing of 4 mm. However, any other thickness, spacing, or other properties of the fins 208 may also be applicable. Additionally, the cooling element 202 may include any number of fins 208. The one or more fins 208 may also be composed of any material, such as, for example, aluminum. The one or more fins 208 may also be nickel-plated or anodized, or may be created through any number of other types of treatment processes. The number of fins 208, size and/or shape of each of the fins 208, and any other properties of the fins 208 and/or the cooling element 202 as a whole may also vary depending on their proximity to locations on the enclosure at which it may be desired to provide additional cooling. For example, a part of an enclosure adjacent to a particular LIDAR electronic may be desired to be cooled to a greater extent than a part of the enclosure not adjacent to any LIDAR electronics (more heat may need to be dissipated from the portions of the enclosure including electronics than the portions of the enclosure not including electronics, for example). In this case, the portion of the cooling element 202 in contact with the part of the enclosure adjacent to the LIDAR electronics may be configured in such a way as to provide additional cooling at that location. That is, the fins of the cooling element 202 at this location may be different in size than fins at locations not associated with electronics.

In some embodiments, the horizontal fins 208 may extend from the enclosure such that the cooling element 202 may generally form a cylindrical or partially-cylindrical shape (for example, as illustrated in FIGS. 2-7). However, the shape of the cooling element 202 may not necessarily be limited to a cylindrical or partially-cylindrical shape. While the shape of the cooling element 202 may be generally cylindrical, the cooling element may also include one or more portions that may not include horizontal fins 208, but may instead include one or more windows 206 in place of the horizontal fins 208 at those particular portions (this may also be illustrated in FIGS. 2-7 as well). The one or more windows 206 may provide signal ingress and/or egress for the electronics housed within the enclosure. For example, as mentioned above, the enclosure may include one or more emitting device(s) and one or more detector device(s). The windows 206 may be positioned such that egress of light signals from the one or more emitting device(s) and ingress of return light signals to the one or more detector device(s) may be possible through the cooling element 202. As such, the one or more windows 206 may comprise a transparent or semi-transparent material, such as glass. Additionally, while the airflow from the environment may be used to cool the cooling element 202, the structural configuration of the cooling element 202 including the horizontal fins 206 may also allow the airflow from the environment to pass over the one or more windows 206. In this manner, the structure of the cooling element 202 may also serve a dual purpose of leveraging the natural airflow from the environment to clear the one or more windows 206 of any contaminants (for example, debris, rain, etc.). The spacing between the horizontal fins 208 may be large enough that cleaning air may be delivered to the windows without any additional air provided from fans or blowers.

In some embodiments, the cooling element 202 may be provided around the enclosure and may be exposed to the environment (for example, may not be covered by an outer rim or solar shield). However, in some embodiments, an outer rim or solar shield may be provided around the cooling element 202 as well. The outer rim or solar shield may be provided to assist in keeping the LIDAR system within thermal requirements at a steady state. That is, the outer rim or solar shield may prevent or mitigate the exposure of the cooling element to solar radiation, which may prevent or mitigate temperature increases of the cooling element 202 based on the solar radiation. Allowing the cooling element 202 to be exposed to the environment without the use of the outer rim or solar shield may allow for more unrestricted airflow through the cooling element, which may enhance the cooling capabilities of the cooling element 202.

Figure 3:
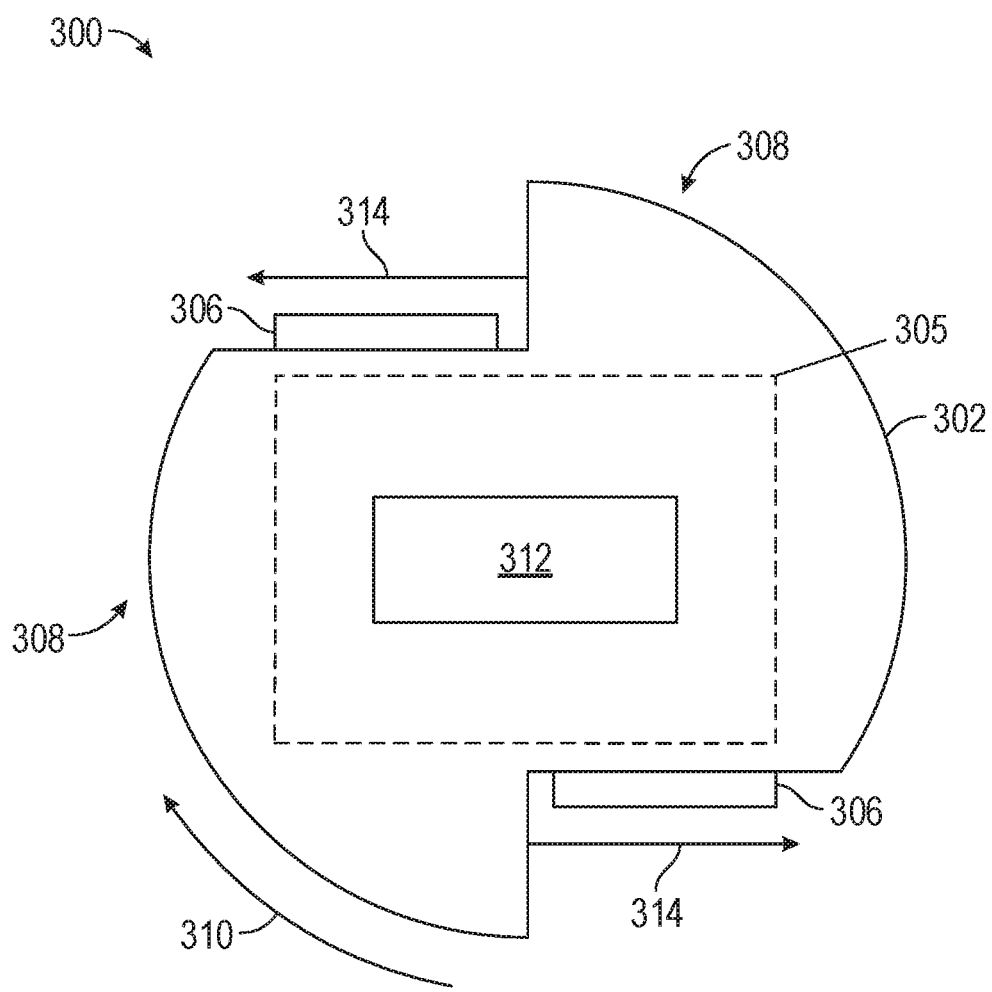
FIG. 3 depicts an example top-down view of a cooling element, in accordance with one or more example embodiments of the disclosure.

FIG. 3 depicts an example top-down view 300 of a cooling element 302 used in a LIDAR sensor head (for example, the sensor head 102 depicted in FIG. 1 or any other sensor head described herein). In some embodiments, the cooling element 302 may include a set of horizontal fins 308 that may surround one or more LIDAR electronics 312 housed within the sensor head. For example, the horizontal fins may be affixed to an enclosure 305 that may house the one or more LIDAR electronics 312. The horizontal fins may rotate along with the rotation 310 of the enclosure 305 housing the one or more LIDAR electronics 312 (based on the rotation of the sensor head 304 (which may be depicted in the figure as a rotation at a frequency of 10 Hz, although any other frequency may also be applicable as well), which may provide air flow 308 that may be used to cool the sensor head and the corresponding LIDAR electronics 314, as well as any surfaces in contact with the LIDAR electronics 312 as well (such as the enclosure 305 housing the one or more LIDAR electronics 312). The sensor head may also include one or more windows 306 (for example, at the external housing and/or enclosure as described above), which may be used to allow light signals to enter and/or exit from the sensor head 304 to allow for light emissions and/or detections by the LIDAR electronics 312 (for example, emissions by the one or more emitting devices and/or detections of return light by the one or more detector devices described with respect to FIG. 1, the one or more emitting devices and/or one or more detector devices described with respect to FIG. 4, or any other LIDAR electronics described herein). It should be noted that the configuration of the cooling element (as well as any other element described herein) may be exemplary, and any other configuration may be applicable as well. For example, any number of fins of any size or shape may be used in the cooling element 302. The size and/or shape of the cooling element 302 as a whole may also vary. For example, the cooling element 302 may wrap around the entirety of the enclosure 305 housing the LIDAR electronics 312, or may only cover a portion of the enclosure 305.

Figure 4:
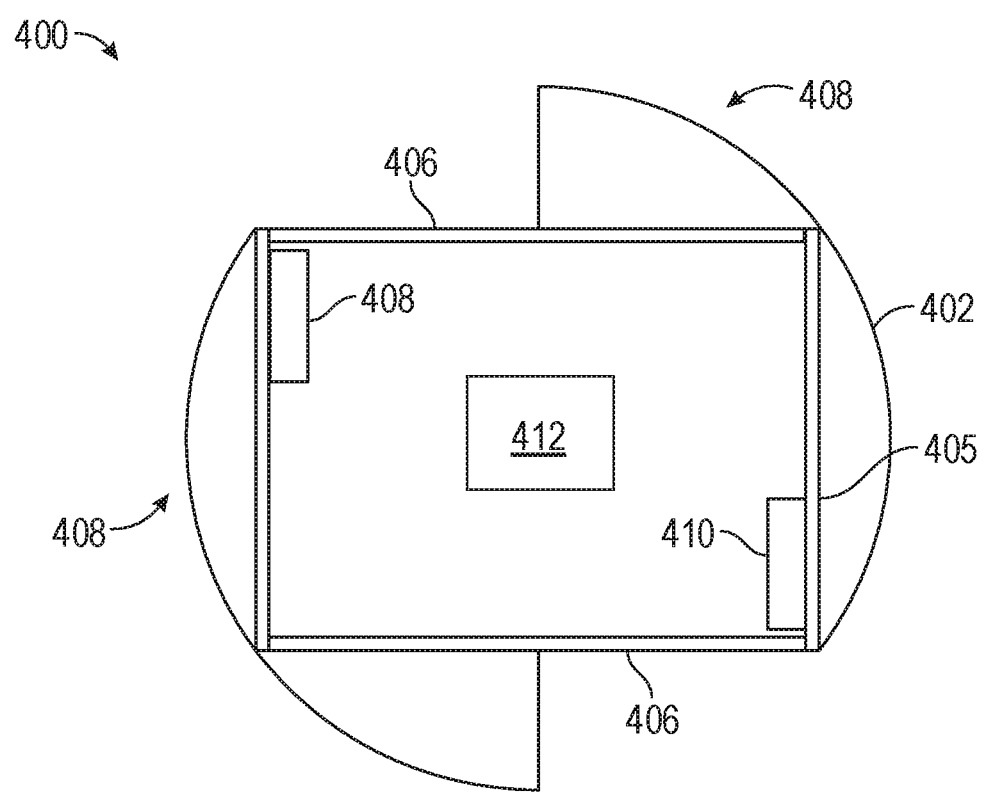
FIG. 4 depicts another example top-down view of a cooling element, in accordance with one or more example embodiments of the disclosure.

FIG. 4 depicts another example top-down view 400 of a cooling element 402 used in a LIDAR sensor head (for example, the sensor head 102 depicted in FIG. 1 or any other sensor head described herein). The top-down view may be similar to top-down view of FIG. 3 (for example, the cooling element may also include the windows 406, as well as any other elements depicted in FIG. 3), but may also depict some of the LIDAR electronics that may be included within an enclosure 405 (which may be the same as the enclosure 305, the enclosure 104, or any other enclosure described herein) as described above with respect to FIG. 3. For example, the LIDAR electronics may include at least one or more emitting device(s) 408 (which may be, for example, the same as the one or more emitting device(s) described with respect to FIG. 1), one or more detector device(s) 410 (which may be, for example, the same as the one or more detector device(s) described with respect to FIG. 1), and one or more computing systems 412 (which may be, for example, the same as the one or more computing systems described with respect to FIG. 1). In some cases, the one or more computing systems 412 may include one or more Field-programmable gate arrays (FPGAs). As aforementioned, the one or more windows 406 may provide signal ingress and/or egress for the electronics housed within the enclosure. For example, the windows 406 may be positioned such that egress of light signals from the one or more emitting device(s) 408 and ingress of return light signals to the one or more detector device(s) 410 may be possible through the cooling element 402. As such, the one or more windows 406 may comprise a transparent or semi-transparent material, such as glass.

Figure 5:
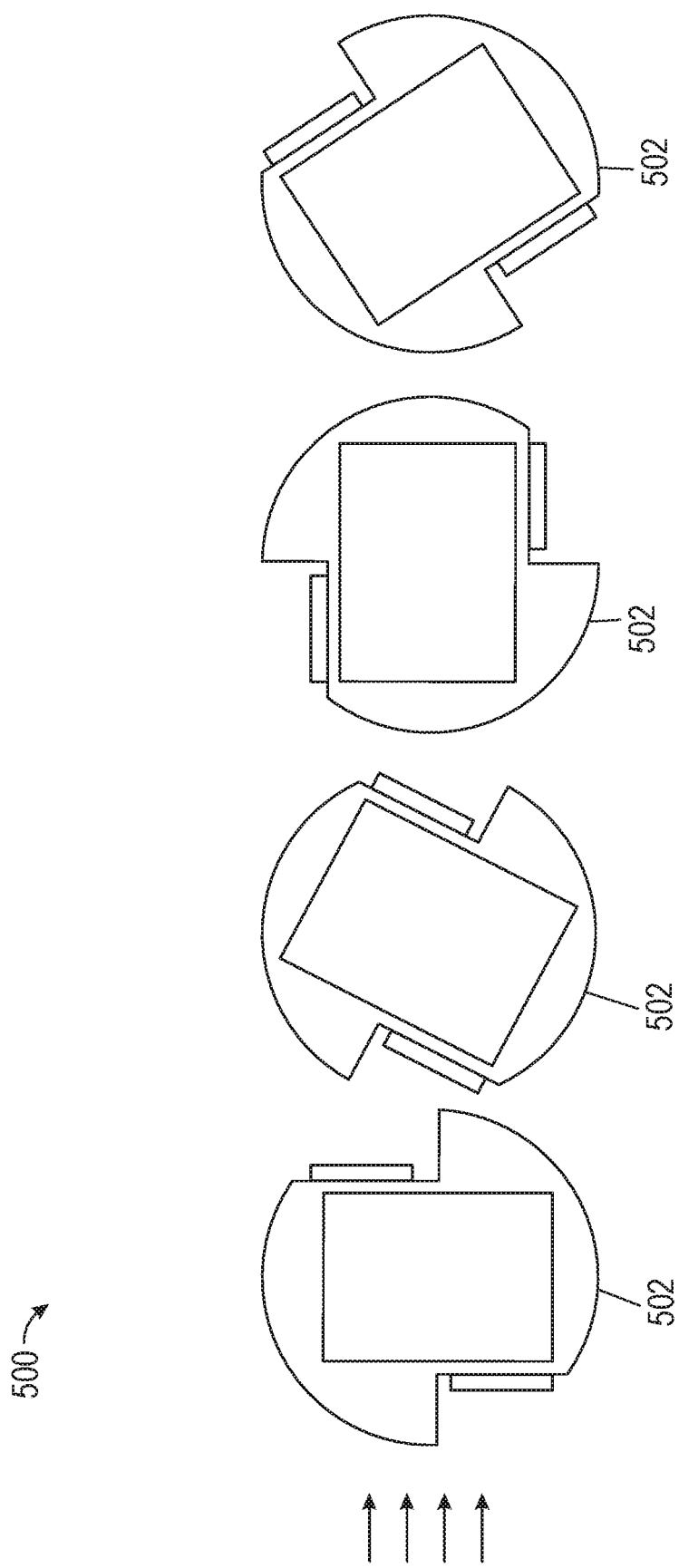
FIG. 5 depicts another example top-down view of a cooling element, in accordance with one or more example embodiments of the disclosure.

FIG. 5 depicts another example top-down view 500 of a cooling element 502 used in a LIDAR sensor head (for example, the sensor head 102 depicted in FIG. 1 or any other sensor head described herein). More particularly, FIG. 5 may depict the rotation of the cooling element 502 and the LIDAR sensor head. As mentioned above, the sensor head may be a part of a LIDAR system included on a vehicle. As the vehicle traverses an environment, the airflow generated around the vehicle may pass through the one or more fins of the cooling element 502 due to their horizontal arrangement. Also as mentioned above, this airflow may allow for cooling of the sensor head and may also allow for any windows included in the sensor head to be cleaned of contaminants (for example, dirt, dust, etc.).

Figure 6B:
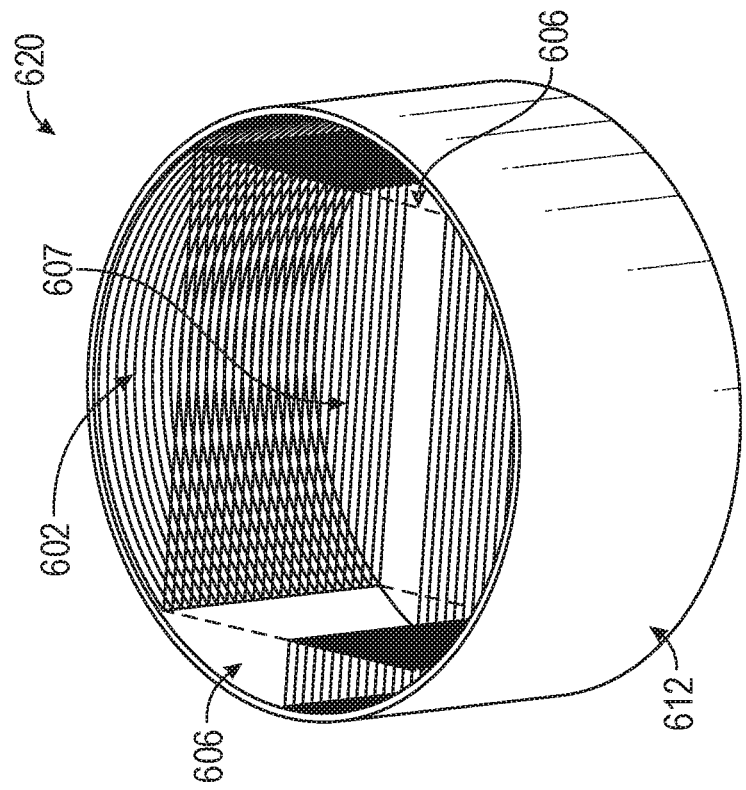
FIGS. 6A-6B depict example perspective views of a cooling element, in accordance with one or more example embodiments of the disclosure.
Figure 6A:
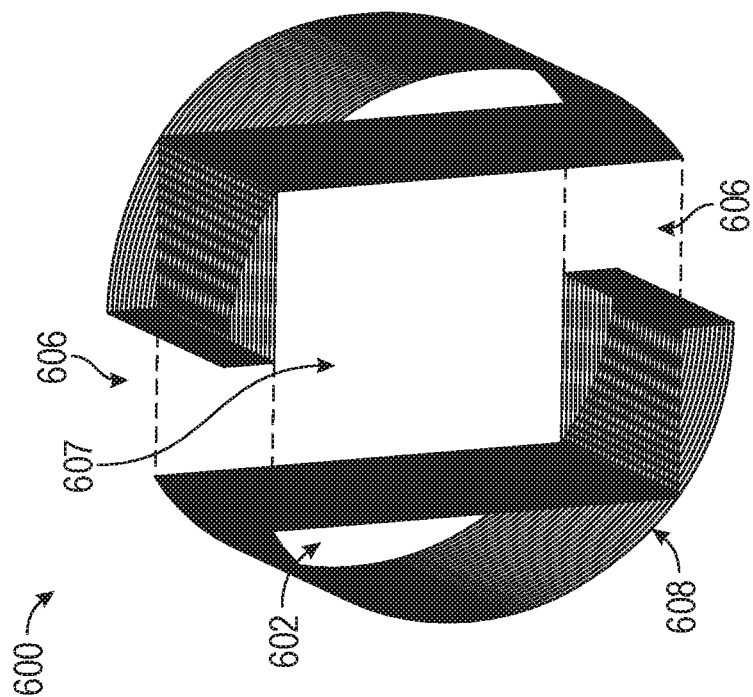

FIGS. 6A-6B depict two additional perspective views of the cooling element 602 used in the LIDAR sensor head.

FIG. 6A depicts one additional perspective view 600. Similar to the perspective view 200 presented in FIG. 2, the perspective view 600 depicts the one or more fins 608 of the cooling element 608. In some cases, air may flow over the fins 608 at a rate of 7 m/s, however, air may flow over the fins at any other rate as well. In some cases, the airflow rate may depend on a rotation rate of the cooling element 608 (and overall sensor head including the cooling element 608). The airflow rate may also depend on any number of other factors, such as a speed of a vehicle to which the sensor head is affixed. The perspective view 600 (as well as the perspective view 620 in FIG. 6B) may not depict the LIDAR electronics in the area 607 within the cooling element 602. However, the perspective view 600 (as well as the perspective view 620) also depicts the one or more windows 606 in the sensor head 604 that may be used to allow light signals to enter and/or exit from the sensor head 604 to allow for emissions and/or detections by the LIDAR electronics (for example, as described above with respect to FIG. 3). FIG. 6B may depict a similar perspective view 620 to the perspective view 600 of FIG. 6A, but may also depict additional components of the sensor head 604. For example, FIG. 6B may also depict a housing 612 in which the cooling element 602 and any electronic components inside the cooling element 602 may be housed. Although not depicted in the figure, the housing 612 may include one or more windows located at the same position as one or more windows 606 associated with the cooling element 602 and/or the enclosure included within the cooling element 602 (for example, an enclosure included in the area 607). In some cases, the housing 612 may serve as a rim or solar shield which can also be provided to block solar loads to the cooling element 602 and/or any other components depicted in the figure or otherwise (for example, any LIDAR electronics, the enclosure housing the LIDAR electronics, etc.). However, in some cases, a rim or solar shield may be a separate component from the housing 612. A rim or solar shield may also have cutouts in locations where the one or more windows 606 may be located to allow ingress and/or egress of light. The shield may also be static with an annular cutout.

FIGS. 7A-7B depict example side views of a cooling element 702. FIG. 7A illustrates a first side view 700 illustrating a perspective of the cooling element 702 showing the one or more fins 708 and a side view of a window 706 of the cooling element 702. FIG. 7B illustrates a second side view 750 of the cooling element 702 showing the one or more fins 708 as well as a front view of a window 706 of the cooling element 702.

Figure 8:
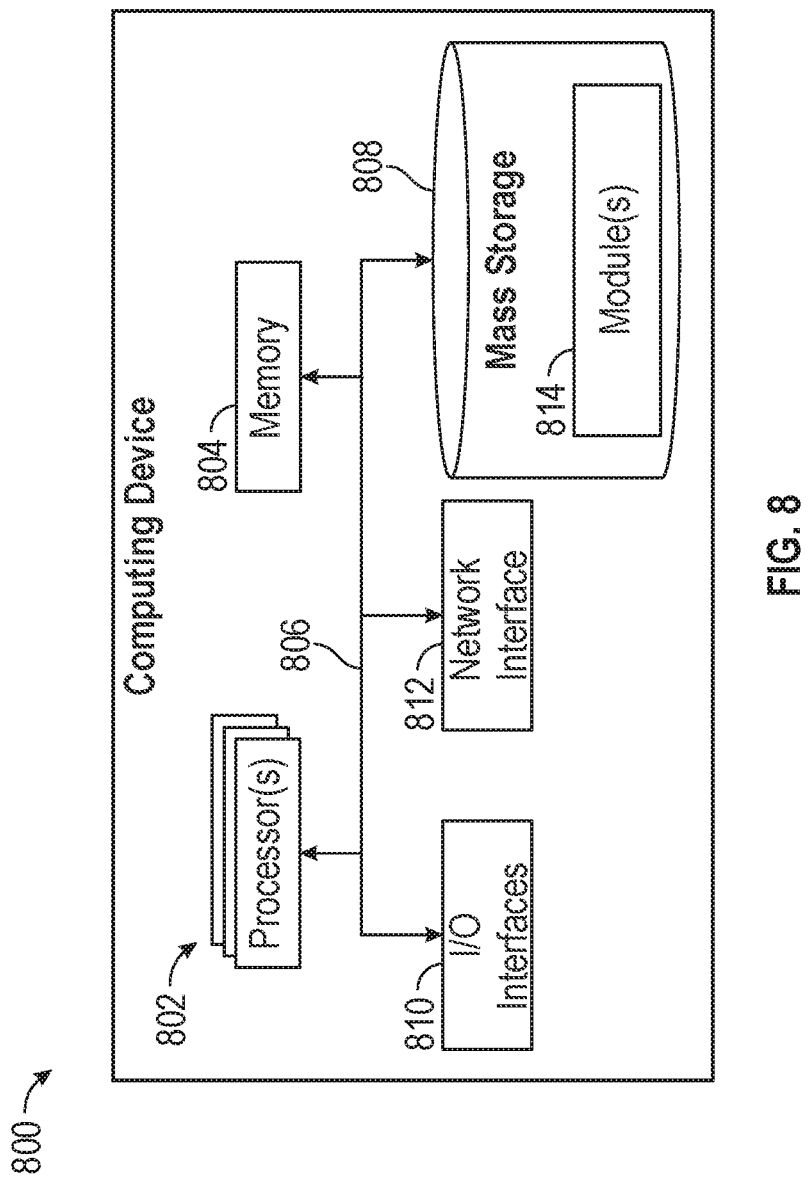
FIG. 8 depicts an example computing system, in accordance with one or more example embodiments of the disclosure.

FIG. 8 illustrates an example computing device 800, in accordance with one or more embodiments of this disclosure. The computing 800 device may be representative of any number of elements described herein. The computing device 800 may include at least one processor 802 that executes instructions that are stored in one or more memory devices (referred to as memory 804). The instructions can be, for instance, instructions for implementing functionality described as being carried out by one or more modules and systems disclosed above or instructions for implementing one or more of the methods disclosed above. The processor(s) 802 can be embodied in, for example, a CPU, multiple CPUs, a GPU, multiple GPUs, a TPU, multiple TPUs, a multi-core processor, a combination thereof, and the like. In some embodiments, the processor(s) 802 can be arranged in a single processing device. In other embodiments, the processor(s) 802 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 802 can access the memory 804 by means of a communication architecture 806 (e.g., a system bus). The communication architecture 806 may be suitable for the particular arrangement (localized or distributed) and type of the processor(s) 802. In some embodiments, the communication architecture 806 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 804 also can retain data.

Each computing device 800 also can include mass storage 808 that is accessible by the processor(s) 802 by means of the communication architecture 806. The mass storage 808 can include machine-accessible instructions (e.g., computer-readable instructions and/or computer-executable instructions). In some embodiments, the machine-accessible instructions may be encoded in the mass storage 808 and can be arranged in components that can be built (e.g., linked and compiled) and retained in computer-executable form in the mass storage 808 or in one or more other machine-accessible non-transitory storage media included in the computing device 800. Such components can embody, or can constitute, one or many of the various modules disclosed herein. Such modules are illustrated as module(s) 814. In some instances, the modules may also be included within the memory 804 as well.

Execution of the module(s) 814, individually or in combination, by at least one of the processor(s) 802, can cause the computing device 800 to perform any of the operations described herein.

Each computing device 800 also can include one or more input/output interface devices 810 (referred to as I/O interface 810) that can permit or otherwise facilitate external devices to communicate with the computing device 800. For instance, the I/O interface 810 may be used to receive and send data and/or instructions from and to an external computing device.

The computing device 800 also includes one or more network interface devices 812 (referred to as network interface(s) 812) that can permit or otherwise facilitate functionally coupling the computing device 800 with one or more external devices. Functionally coupling the computing device 800 to an external device can include establishing a wireline connection or a wireless connection between the computing device 800 and the external device. The network interface devices 812 can include one or many antennas and a communication processing device that can permit wireless communication between the computing device 800 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth®, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 812 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A LIDAR sensor head comprising:
an enclosure including one or more electronics;
a cooling element provided externally to the enclosure, the cooling element comprising one or more horizontal fins; and
an external housing configured to receive airflow from an environment external to the LIDAR sensor head through one or more openings and to expel airflow from the external housing through the one or more openings, wherein the cooling element is disposed within the external housing.

2. The LIDAR sensor head of claim 1, wherein the cooling element is affixed to an outer wall of the enclosure.

3. The LIDAR sensor head of claim 1, wherein the one or more openings comprise a first opening configured to receive the airflow from the environment external to the LIDAR sensor head and a second opening configured to expel the airflow within the external housing.

4. The LIDAR sensor head of claim 1, wherein the cooling element includes a plurality of horizontal fins, the plurality of horizontal fins being individually affixed to the enclosure.

5. The LIDAR sensor head of claim 1, wherein the cooling element further comprises one or more transparent windows or windows, the one or more transparent windows or windows being positioned in line with one or more emitters and one or more detectors of the one or more electronics inside the enclosure.

6. The LIDAR sensor head of claim 1, wherein the cooling element is cylindrical in shape, and is configured to rotate with a rotation of the LIDAR sensor head.

7. The LIDAR sensor head of claim 1, wherein the one or more horizontal fins are separated by a spacing of less than 5 millimeters.

8. A LIDAR system comprising:
an enclosure including one or more electronics;
a cooling element provided externally to the enclosure, the cooling element comprising one or more horizontal fins; and
an external housing configured to receive airflow from an environment external to a LIDAR sensor head of the LIDAR system through one or more openings and to expel airflow from the external housing through the one or more openings, wherein the cooling element is disposed within the external housing.

9. The LIDAR system of claim 8, wherein the cooling element is affixed to an outer wall of the enclosure.

10. The LIDAR system of claim 8, wherein the one or more openings comprise a first opening configured to receive the airflow from the environment external to the LIDAR system and a second opening configured to expel the airflow within the external housing.

11. The LIDAR system of claim 8, wherein the cooling element includes a plurality of horizontal fins, the plurality of horizontal fins being individually affixed to the enclosure.

12. The LIDAR system of claim 8, wherein the cooling element further comprises one or more transparent windows or windows, the one or more transparent windows or windows being positioned in line with one or more emitters and one or more detectors of the one or more electronics inside the enclosure.

13. The LIDAR system of claim 8, wherein the cooling element is cylindrical in shape, and is configured to rotate with a rotation of the LIDAR system.

14. The LIDAR system of claim 8, wherein the one or more horizontal fins are separated by a spacing of less than 5 millimeters.

15. A cooling element for a LIDAR system comprising:
one or more horizontal fins, wherein the cooling element is provided externally to an enclosure including one or more electronics, wherein the cooling element is disposed within an external housing, wherein the external housing is configured to receive airflow from an environment external to a LIDAR sensor head of the LIDAR system through one or more openings and to expel airflow from the external housing through the one or more openings, wherein the cooling element is disposed within the external housing.

16. The cooling element of claim 15, wherein the cooling element is affixed to an outer wall of the enclosure.

17. The cooling element of claim 15, wherein the one or more openings comprise a first opening configured to receive the airflow from the environment external to the LIDAR system and a second opening configured to expel the airflow within the external housing.

18. The cooling element of claim 15, wherein the cooling element includes a plurality of horizontal fins, the plurality of horizontal fins being individually affixed to the enclosure.

19. The cooling element of claim 15, wherein the cooling element further comprises one or more transparent windows or windows, the one or more transparent windows or windows being positioned in line with one or more emitters and one or more detectors of the one or more electronics inside the enclosure.

20. The cooling element of claim 15, wherein the cooling element is cylindrical in shape, and is configured to rotate with a rotation of the LIDAR sensor head.

* * * * *